(12) United States Patent
Kang et al.

(10) Patent No.: US 7,990,914 B2
(45) Date of Patent: Aug. 2, 2011

(54) METHOD FOR EVALUATING SPECTRUM UTILIZATION EFFICIENCY IN RADIO SYSTEM SHARING FREQUENCY

(75) Inventors: Hyunduk Kang, Daejon (KR);
Chang-Joo Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 551 days.

(21) Appl. No.: 12/182,569

(22) Filed: Jul. 30, 2008

(65) Prior Publication Data

US 2009/0154409 A1 Jun. 18, 2009

(30) Foreign Application Priority Data

Dec. 17, 2007 (KR) .................. 10-2007-0132527

(51) Int. Cl.
*H04W 16/00* (2009.01)
(52) U.S. Cl. .................. 370/328; 370/343; 455/446
(58) Field of Classification Search .................. None
See application file for complete search history.

(56) References Cited

U.S. PATENT DOCUMENTS

| | | | | |
|---|---|---|---|---|
| 5,924,036 A | * | 7/1999 | Gustafson | 455/447 |
| 2003/0157939 A1 | * | 8/2003 | Wang et al. | 455/446 |
| 2003/0198200 A1 | * | 10/2003 | Diener et al. | 370/329 |
| 2007/0223419 A1 | * | 9/2007 | Ji et al. | 370/329 |
| 2008/0108366 A1 | * | 5/2008 | Hu | 455/452.1 |

FOREIGN PATENT DOCUMENTS

KR 2006-0065304 A 6/2006

OTHER PUBLICATIONS

Lim et al; Spectrum Efficiency Analysis of Spectrum Overlay Technology on TV Band; Information & Communications Magazine Issued by Korea Institute of Communication Sciences, vol. 24, No. 9, Sep. 2007; pp. 15-21.

* cited by examiner

*Primary Examiner* — Min Jung
(74) *Attorney, Agent, or Firm* — Rabin & Berdo, P.C.

(57) ABSTRACT

Provided is a method for evaluating spectrum utilization efficiency in a radio system sharing frequency. The method for evaluating spectrum utilization efficiency of a frequency sharing radio system in a radio environment having a first radio system using at least one specific frequency in an allocated frequency band and a second radio system sharing the frequency band allocated by the first radio system, includes calculating net coverage per unit area based on a design parameter on the first radio system and a design parameter on the second radio system; and evaluating spectrum utilization efficiency based on the calculated net coverage per unit area.

10 Claims, 3 Drawing Sheets

METHOD FOR EVALUATING SPECTRUM UTILIZATION EFFICIENCY IN RADIO SYSTEM SHARING FREQUENCY

CROSS-REFERENCE(S) TO RELATED APPLICATIONS

The present invention claims priority of Korean Patent Application No. 10-2007-0132527, filed on Dec. 17, 2007, which is incorporated herein by reference.

BACKGROUND OF THE INVENTION

1. Field of the Invention

The present invention relates to a method for evaluating spectrum utilization efficiency in a radio system sharing frequency; and, more particularly, to a method for evaluating spectrum utilization efficiency based on frequency sharing technology when a Digital television (DTV) system in a TV band shares a frequency with a cognitive radio system of a spectrum overlay technique.

This work was supported by the IT R&D program for MIC/IITA [2005-S-046-03, "Development of the basic spectrum resource utilizing technology"].

2. Description of Related Art

According to development of radio communication technology and introduction of a new wireless communication service, it is required to efficiently use limited frequency resources. A method for maximizing spectral efficiency and a method for minimizing interference with another wireless communication system through performance optimization of the wireless communication system, e.g., multiple access, coding technology, modulation efficiency, and information compression technology, are used in order to increase spectrum utilization efficiency.

As another access method having a different approach from those of the above methods, frequency sharing technology for increasing spectrum utilization efficiency in a frequency band in use has been studied. As shown in FIG. 1, the frequency sharing technology includes a spectrum underlay method where a secondary user shares spectrum without interfering existing users with very low power density, which is similar to the noise floor as shown in FIG. 1, by using a wide frequency band, and a spectrum overlay method where the secondary user shares the frequency without interfering a primary licensee in case that the primary licensee does not use the frequency.

Ultra wide band technology is the representative example of the spectrum underlay method. Cognitive radio technology is the representative example of the spectrum overlay technique.

In Institute of Electrical and Electronics Engineers (IEEE) 802.22 Wireless Regional Area Network (WRAN) working group, which is an International Organization for Standardization, standardization related to the cognitive radio technology for increasing spectrum utilization efficiency in the TV band is being discussed actively.

An index showing spectrum utilization efficiency is required to evaluate the spectrum utilization efficiency of the radio system. The spectrum utilization efficiency of the radio system defined in ITU-R SM. 1046 recommendation and National Telecommunications and Information Administration (NTIA) report from USA may be expressed as follows:

$$SUE = \frac{M}{B \times S \times T}$$

where M represents the quantity of transmitted information; B represents a radio bandwidth; S represents a geometrical space where the wireless communication system is serviced, which is generally a wireless communication coverage region; and T represents a service time.

The definition on the spectrum utilization efficiency described above is generally applied to all radio systems. However, since diverse radio systems have different characteristic features, the methods showing the spectrum utilization efficiency may be differed. For example, since the main object of a point-to-point micro wave radio system is long-distance signal transmission, a transmission/reception distance is added as a main element. In case of broadcasting, a service region is added as a main element.

The above conventional spectrum utilization efficiency index is used to evaluate the spectrum utilization efficiency on the specific wireless communication system, e.g., channel capacity, which is used in a given frequency band without considering the frequency share environment. In particular, in case of sharing the frequency band in use according to the overlay frequency sharing method such as a cognitive radio system, it is not proper to evaluate spectrum utilization efficiency by using the conventional spectrum utilization efficiency evaluation index.

In other words, it is difficult to evaluate spectrum utilization efficiency by frequency sharing of the DTV system and the cognitive radio system of the spectrum overlay technique in the TV band with channel capacity per coverage area used to evaluate spectrum utilization efficiency of the general wireless communication system or the conventional spectrum utilization efficiency evaluation index such as the coverage area per frequency used to show the spectrum utilization efficiency of the broadcasting system.

SUMMARY OF THE INVENTION

An embodiment of the present invention is directed to providing a method for evaluating spectrum utilization efficiency based on frequency sharing technology when a Digital television (DTV) system in a TV band shares a frequency with a cognitive radio system of a spectrum overlay technique.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a method for evaluating spectrum utilization efficiency of a frequency sharing radio system in a radio environment having a first radio system using at least one specific frequency in an allocated frequency band and a second radio system sharing the frequency band allocated by the first radio system, including: calculating net coverage per unit area based on a design parameter on the first radio system and a design parameter on the second radio system; and evaluating spectrum utilization efficiency based on the calculated net coverage per unit area.

Preferably, the coverage of the first radio system using a specific frequency is partially overlapped with the coverage of the second radio system using the specific frequency, the net coverage per unit area is calculated by subtracting all regions overlapped according to the frequency from the value obtained by summing each coverage of the first radio systems using the specific frequency and each coverage of the second radio systems using the specific frequency.

Preferably, the overlap region of the cells of the first radio system using the first frequency and the first radio system using the second frequency is calculated based on the cell radius of the first radio system and distance information between centers of two cells.

Preferably, the overlap region of the cells of the second radio system using the first frequency and the second radio system using the second frequency is calculated based on the cell radius of the second radio system and cell number information of the second radio system overlapped with the distance between the cell centers.

Preferably, the overlap region of the cells of the first radio system using the second frequency and the second radio system using the first frequency is calculated based on a cell radius (a) of the first radio system, a cell radius (b) of the second radio system, a distance (c) between the cell centers of the first radio system and the second radio system, and an angle between sides of triangle which is formed of the cell radius (a) of the first radio system, the cell radius (b) of the second radio system, the distance (c) between the cell centers of the first radio system and the second radio system.

Preferably, the overlap region of the cells of the first radio system using the first frequency and the second radio system using the second frequency is calculated based on a cell radius (a) of the first radio system, a cell radius (b) of the second radio system, a distance (c) between the cell centers of the first radio system and the second radio system, and an angle between sides of triangle which is formed of the cell radius (a) of the first radio system, the cell radius (b) of the second radio system, the distance (c) between the cell centers of the first radio system and the second radio system.

In accordance with another aspect of the present invention, there is provided a method for evaluating spectrum utilization efficiency of a frequency sharing radio system in a radio environment having a first radio system using at least one specific frequency in an allocated frequency band and a second radio system sharing the frequency band allocated to the first radio system, including: calculating addition of coverage by frequency sharing based on a design parameter on the first radio system and a design parameter of the second radio system; calculating net coverage by subtracting the region overlapped according to the frequency from the addition of the calculated coverage; and evaluating spectrum utilization efficiency based on the calculated net coverage.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

In order to analyze spectrum utilization efficiency of a case where a cognitive radio technology utilizing a spectrum overlay sharing technology for a Digital television (DTV) system in a TV band, DTV service coverage in use should be calculated and installation scenario of Wireless Regional Area Network (WRAN) cell should be set up.

According to the related document of Institute of Electrical and Electronics Engineers (IEEE) 802.22 WRAN standardization group, it is possible to operate a WRAN system on the frequency without interference with the DTV system in a rest region except coverage and protection range of the DTV system using the frequency band in a given region. Since there are a plurality of TV frequency bands in the given region, there may be a plurality of DTV systems using each frequency band. Accordingly, it is possible to operate the WRAN cell according to each frequency band.

It is required to establish a design plan on two wireless communication systems to evaluate the spectrum utilization efficiency in the wireless communication system using frequency sharing technology in accordance with the present invention.

Figure 1:
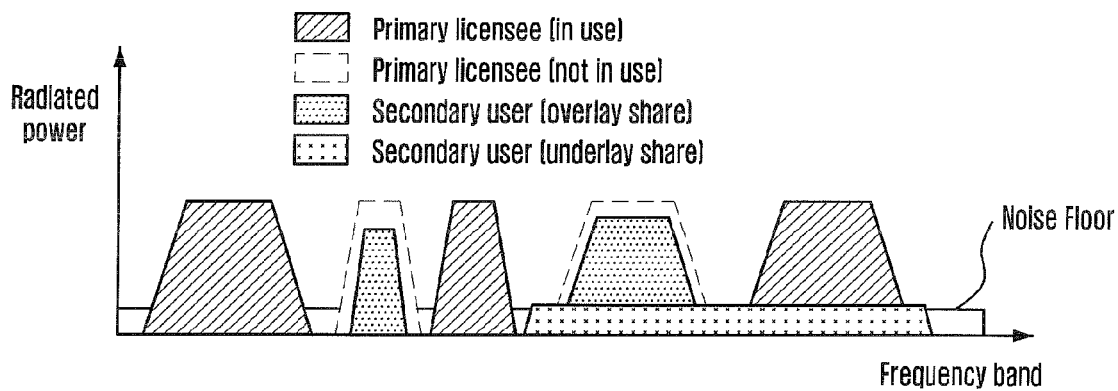
FIG. 1 shows a frequency sharing technology.
Figure 2:
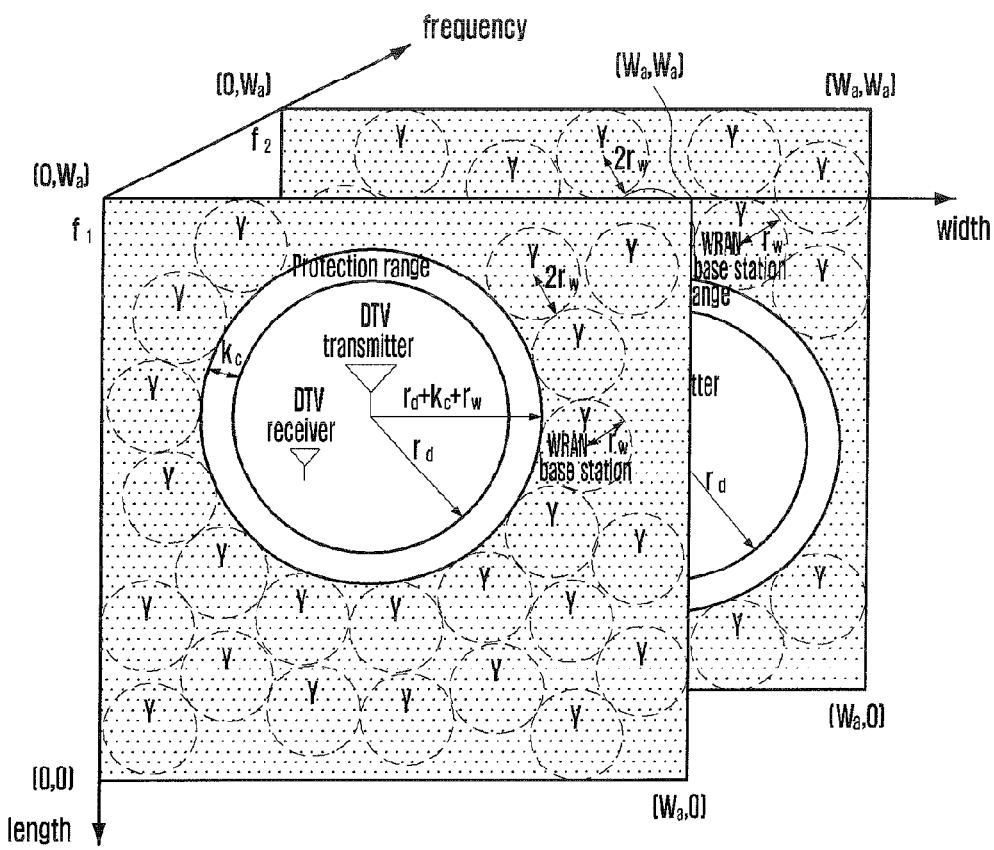
FIG. 2 shows a Wireless Regional Area Network (WRAN) base station disposing method according to digital TV (DTV) service coverage using individual frequencies in accordance with an embodiment of the present invention.

FIG. 2 shows a WRAN base station disposing method according to the DTV service coverage in the given region for $f_1$ and $f_2$ frequencies. It is assumed that each cell is circle. When the disposing method is extended, it is possible to consider more than three frequencies as a frequency axis.

In FIG. 2, $w_a$ represents a width and length of a given region; $r_d$ represents the service coverage of DTV; $k_c$ represents the protection distance of the DTV system, i.e., a DTV-WRAN keep-out distance; and $r_w$ represents a WRAN cell radius. A donut-shape region having a width $k_c$ is a protection range of the DTV system.

A valid location of the WRAN base station is set up according to a tier-by-tier method based on a center location $(x_d, y_d)$ of the DTV cell within the given region $w_a^2$ km$^2$ by using parameters and spectrum utilization efficiency by frequency sharing of two systems within the given region is evaluated.

A conventional spectrum utilization efficiency evaluation index for wireless communication is spectral efficiency. The spectral efficiency means channel capacity per unit coverage, adopts the unit of bits/s/Hz/m$^2$, and may be called system spectral efficiency.

The conventional spectrum utilization efficiency evaluation index for the broadcasting system is coverage efficiency. The coverage efficiency is an index showing a service region, which is important in a broadcasting service, and means coverage per unit frequency. The unit of the coverage efficiency is km$^2$/Hz.

Since it is not proper to evaluate the spectrum utilization efficiency with above two indexes, which are the conventional spectrum utilization efficiency evaluating method, in a frequency sharing environment by a cognitive radio system, the present invention suggests a new evaluation index for improvement.

The new evaluation index suggested in the present invention is area efficiency. The area efficiency means net coverage per unit area and the unit is expressed m$^2$/m$^2$, i.e., a rate. The new evaluation index is an index acquired from the fact that frequency sharing is efficient such that more than two system coverage used in the given region can completely cover the given region when a spectrum overlay technique of sharing a valid frequency band in case where the primary licensee does not use the frequency band due to the regional problem.

When one frequency band is given, the area efficiency is acquired by adding the coverage of each system. However, when more than two frequency bands are given, concept of net coverage should be used since addition of the coverage may be larger than the area of the given region when the coverage of each system acquired according to each frequency band is simply added.

The net coverage is coverage where a region overlapped in each frequency band is removed from the addition of the coverage acquired through frequency sharing for each frequency in the given region. The net coverage is an index showing how widely the frequency bands given according to each region by frequency sharing is utilized in the given region. That is, the maximum value of the area efficiency is 1 and the given frequency bands may be used in all area of the given region. In this case, the spectrum utilization efficiency by the frequency sharing is maximized.

As shown in FIG. 2, a usable region of the WRAN cell is determined according to the location of the DTV cell using the frequency. The region of the WRAN cell includes full overlap, partial overlap and no overlap with the DTV cell.

A method for evaluating spectrum utilization efficiency using diverse parameters determined according to the design plan of the wireless communication system will be described.

As shown in FIG. 2, the net coverage according to the given frequencies in the given region by frequency sharing is a value where all coverage of the DTV and WRAN cell for one frequency band is added in case that two DTV cells are completely overlapped. When two DTV cells are partially overlapped or not overlapped, more complicated procedure is required to acquire the net coverage. The present invention suggests a method for mathematically acquiring the net coverage. In this case, the net coverage is acquired through 8 constituent elements as shown in Equation 1.

net coverage by frequency sharing=DTV cell area using $f_1$ frequency band+DTV cell area using $f_2$ frequency band−overlap region of DTV cell using $f_1$ frequency band and DTV cell using $f_2$ frequency band+WRAN cell area using $f_1$ frequency band+WRAN cell area using $f_2$ frequency band−overlap region of WRAN cell using $f_1$ frequency band and WRAN cell using $f_2$ frequency band−overlap region of DTV cell using $f_2$ frequency band and WRAN cell using $f_1$ frequency band−overlap region of DTV cell using $f_1$ frequency band and WRAN cell using $f_2$ frequency band  Eq. 1

In Equation 1, the DTV cell area using the $f_1$ frequency band, the DTV cell area using the $f_2$ frequency band, the WRAN cell area using the $f_1$ frequency band, and the WRAN cell area using the $f_2$ frequency band can be easily acquired by the DTV cell and the WRAN cell radius.

The overlap region of the DTV cell using the $f_1$ frequency band and the DTV cell using the $f_2$ frequency band, the overlap region of the WRAN cell using the $f_1$ frequency band and the WRAN cell using the $f_2$ frequency band, and the overlap region of the DTV cell using the $f_2$ frequency band and the WRAN cell using the $f_1$ frequency band can be acquired according to the overlap format of the cells.

Figure 3:
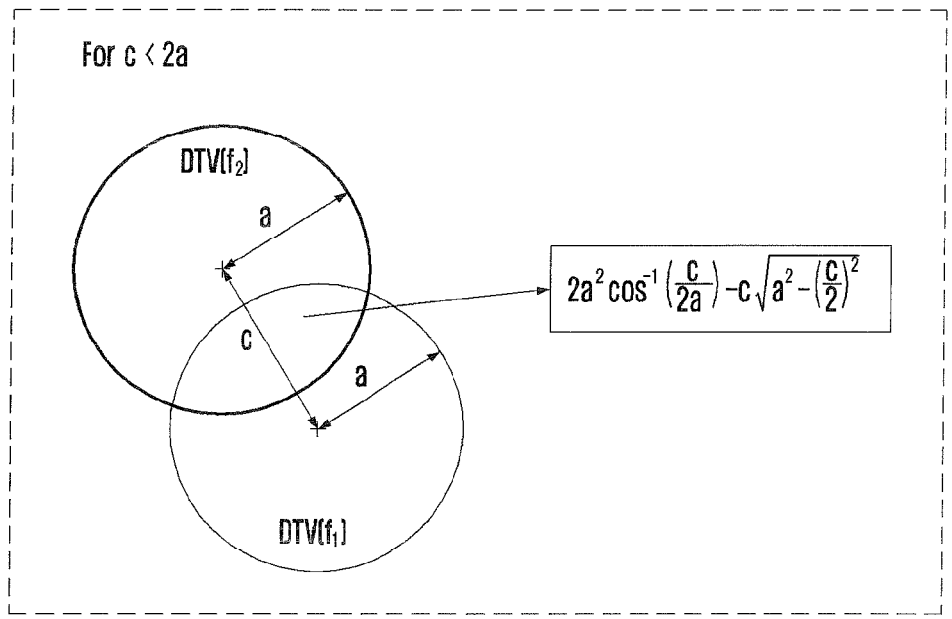
FIGS. 3 to 6 show a net coverage calculating method in accordance with an embodiment of the present invention.

As shown in FIG. 3, when the DTV cell using the $f_1$ frequency band and the DTV cell using the $f_2$ frequency band are partially overlapped under the condition c<2a, the overlap region can be acquired as shown in Equation 2.

$$2a^2\cos^{-1}\left(\frac{c}{2a}\right) - c\sqrt{a^2 - \left(\frac{c}{2}\right)^2}$$  Eq. 2

In Equation 2, a represents the radius of the DTV cell and c represents the distance between two DTV cell centers.

Figure 4:
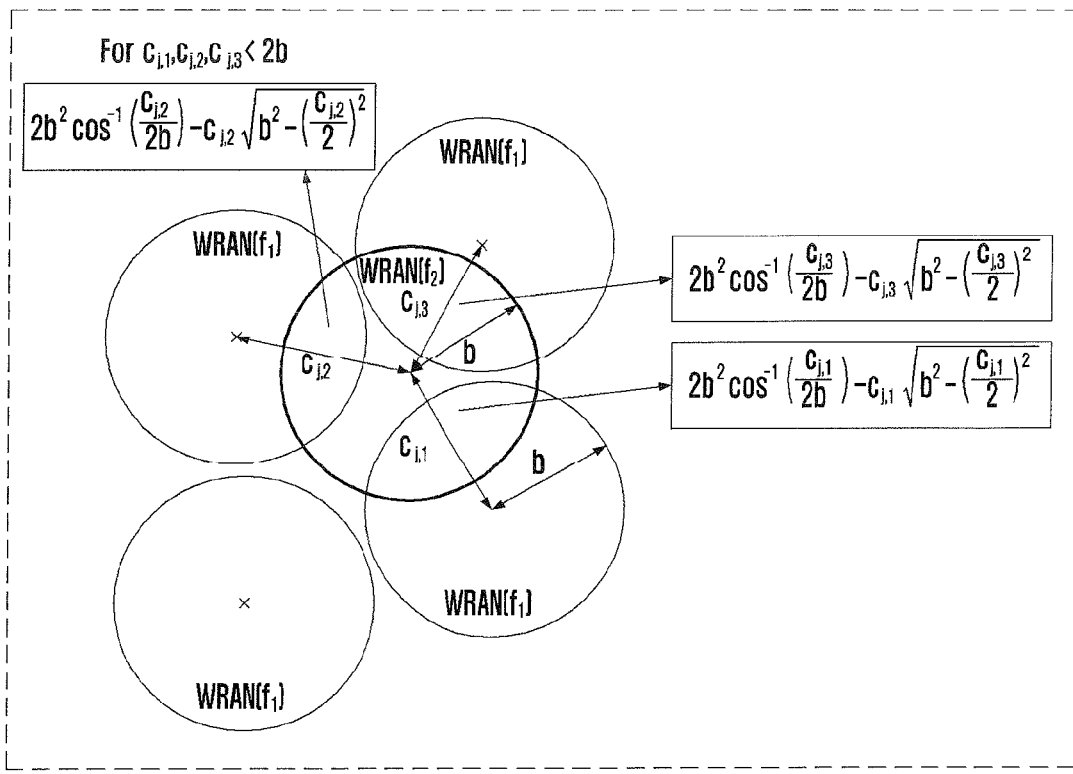

As shown in FIG. 4, when the WRAN cell using the $f_1$ frequency band and the WRAN cell using the $f_2$ frequency band are partially overlapped under the condition $c_{j,i}$<2b, the overlap region can be acquired as shown in Equation 3.

$$\sum_{j=1}^{M}\sum_{i=1}^{N_j} 2b^2\cos^{-1}\left(\frac{c_{j,i}}{2b}\right) - c_i\sqrt{b^2 - \left(\frac{c_{j,i}}{2}\right)^2}$$  Eq. 3

In Equation 3, M represents the number of the WRAN cells using the $f_2$ frequency band; $N_j$ represents the number of the WRAN cells using the $f_1$ frequency band overlapped with the $j^{th}$ WRAN cell using the $f_2$ frequency band; b represents the radius of the WRAN cell; and $c_{j,i}$ represents the distance between centers of the $j^{th}$ WRAN cell using the $f_2$ frequency band and the $i^{th}$ WRAN cell using the $f_1$ frequency band overlapped with the $j^{th}$ WRAN cell.

The overlap region of the DTV cell using the $f_2$ frequency band and the WRAN cell using the $f_1$ frequency band can be divided into following 4 cases and calculated. The following procedures are related to the DTV cell using the $f_2$ frequency band and one WRAN cell using the $f_1$ frequency band overlapped with the DTV cell. Calculation is performed by adding all results acquired by repeating the same procedure for each WRAN cell when the overlapped WRAN cells are more than two.

First, when 0≦c≦(a−b), i.e., when the $f_1$ WRAN cell is completely included in the $f_2$ DTV cell region, the area of the WRAN cell is the same as the overlap region.

Second, when c≧(a+b), i.e., when the $f_1$ WRAN cell is not included in the $f_2$ DTV cell region, the overlap region is 0.

Figure 5:
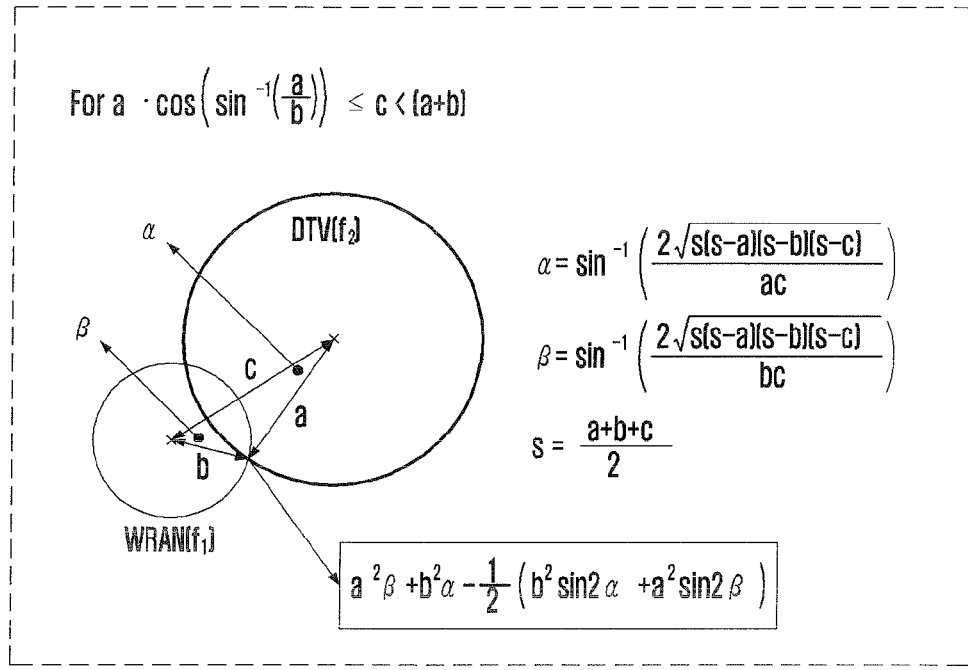

Third, when $$a \cdot \cos\left(\sin^{-1}\left(\frac{b}{a}\right)\right) \le c < (a+b),$$

i.e., when the $f_1$ WRAN cell is partially included in the $f_2$ DTV cell region as shown in FIG. 5, the overlap region can be calculated as shown in Equation 4.

$$a^2\beta + b^2\alpha - \frac{1}{2}(b^2\sin 2\alpha + a^2\sin 2\beta)$$  Eq. 4

In Equation 4, a is the radius of the DTV cell; b is the radius of the WRAN cell; and c is the distance between the centers of the WRAN cell and the DTV cell. An angle α is an angle between sides ac of a triangle abc and an angle β is an angle between sides bc of the triangle abc.

Figure 6:
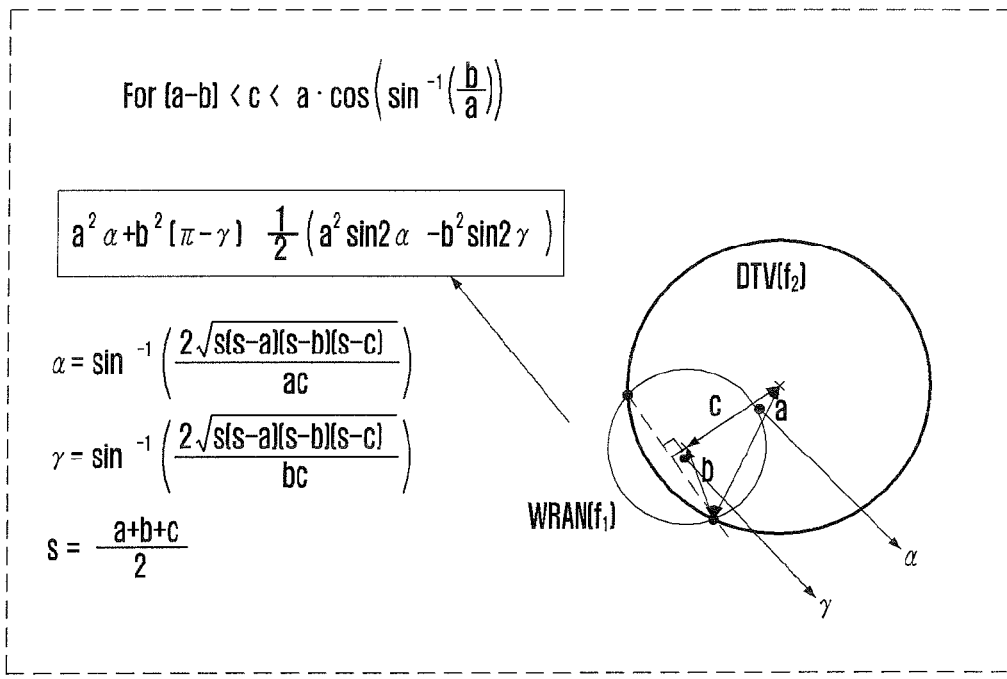

Fourth, when $$(a-b) < c < a \cdot \cos\left(\sin^{-1}\left(\frac{b}{a}\right)\right),$$

i.e., as shown in FIG. 6, when the part that the $f_1$ WRAN cell is overlapped with the $f_2$ DTV cell region is larger than the part shown in FIG. 5, the overlap region is calculated as shown in Equation 5.

$$a^2\alpha + b^2(\pi - \gamma) - \frac{1}{2}(a^2\sin 2\alpha - b^2\sin 2\gamma) \quad \text{Eq. 5}$$

In Equation 5, a represents the radius of the DTV cell; b represents the radius of the WRAN cell; and c represents the distance between the centers of the WRAN cell and the DTV cell. An angle α is an angle between sides ac of the triangle abc and an angle γ is a supplementary angle of the angle between sides bc of the triangle abc.

Finally, the overlap region of the DTV cell using the $f_1$ frequency band and the WRAN cell using the $f_2$ frequency band can be calculated according to the method of calculating the overlap region of the DTV cell using the $f_2$ frequency band and the WRAN cell using the $f_1$ frequency band.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

When the DTV system in the TV band where a plurality of frequency bands exist shares the frequency with the WRAN system of the cognitive radio method of the spectrum overlay technique, the present invention can exactly evaluate the performance of the frequency sharing technology by suggesting the area efficiency, which is a new index for evaluating the spectrum utilization efficiency.

While the present invention has been described with respect to the specific embodiments, it will be apparent to those skilled in the art that various changes and modifications may be made without departing from the spirit and scope of the invention as defined in the following claims.

What is claimed is:

1. A method for evaluating spectrum utilization efficiency of a frequency sharing radio system in a radio environment having a first radio system using at least one specific frequency in an allocated frequency band and a second radio system sharing the frequency band allocated by the first radio system, comprising:
    calculating a net coverage per unit area based on a design parameter of the first radio system and a design parameter of the second radio system; and
    evaluating spectrum utilization efficiency based on the calculated net coverage per unit area.

2. The method of claim 1, wherein the coverage of the first radio system using a specific frequency is partially overlapped with the coverage of the second radio system using the specific frequency, the net coverage per unit area is calculated by subtracting all regions overlapped according to the frequency from the value obtained by summing each coverage of the first radio systems using the specific frequency and each coverage of the second radio systems using the specific frequency.

3. The method of claim 2, wherein all regions overlapped according to the frequency band include an overlap region of cells of the first radio system using a first frequency and the first radio system using a second frequency, an overlap region of cells of the second radio system using the first frequency and the second radio system using the second frequency, an overlap region of cells of the first radio system using the second frequency and the second radio system using the first frequency, and an overlap region of cells of the first radio system using the first frequency and the second radio system using the second frequency.

4. The method of claim 3, wherein the overlap region of the cells of the first radio system using the first frequency and the first radio system using the second frequency is calculated based on the cell radius of the first radio system and distance information between centers of two cells.

5. The method of claim 3, wherein the overlap region of the cells of the second radio system using the first frequency and the second radio system using the second frequency is calculated based on the cell radius of the second radio system and cell number information of the second radio system overlapped with the distance between the cell centers.

6. The method of claim 3, wherein the overlap region of the cells of the first radio system using the second frequency and the second radio system using the first frequency is calculated based on a cell radius (a) of the first radio system, a cell radius (b) of the second radio system, a distance (c) between the cell centers of the first radio system and the second radio system, and an angle between sides of triangle which is formed of the cell radius (a) of the first radio system, the cell radius (b) of the second radio system, the distance (c) between the cell centers of the first radio system and the second radio system.

7. The method of claim 3, wherein the overlap region of the cells of the first radio system using the first frequency and the second radio system using the second frequency is calculated based on a cell radius (a) of the first radio system, a cell radius (b) of the second radio system, a distance (c) between the cell centers of the first radio system and the second radio system, and an angle between sides of triangle which is formed of the cell radius (a) of the first radio system, the cell radius (b) of the second radio system, the distance (c) between the cell centers of the first radio system and the second radio system.

8. A method for evaluating spectrum utilization efficiency of a frequency-sharing radio system in a radio environment having a first radio system using at least one specific frequency in an allocated frequency band and a second radio system sharing the frequency band allocated to the first radio system, comprising:
    calculating a sum of coverage by frequency sharing based on a design parameter of the first radio system and a design parameter of the second radio system;
    calculating a net coverage by subtracting the region overlapped according to the frequency from the addition of the calculated coverage; and
    evaluating spectrum utilization efficiency based on the calculated net coverage.

9. The method of claim 8, wherein the overlap region of cells of the first radio system using the first frequency and the first radio system using the second frequency is calculated based on the cell radius of the first radio system and distance information between two cell centers.

10. The method of claim 8, wherein the overlap region of cells of the second radio system using the first frequency and the second radio system using the second frequency is calculated based on the cell radius of the second radio system and cell number information of the second radio system overlapped with a distance between cell centers.

\* \* \* \* \*